United States Patent
Horie et al.

(10) Patent No.: US 6,533,691 B2
(45) Date of Patent: Mar. 18, 2003

(54) LOW NOISE SILENT CHAIN

(75) Inventors: Hiroshi Horie, Osaka (JP); Kazumasa Matsuno, Osaka (JP); Shigekazu Fukuda, Osaka (JP); Takayuki Funamoto, Osaka (JP); Yoshinori Iwasaki, Osaka (JP); Nobuto Kozakura, Osaka (JP); Toyonaga Saito, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 09/809,504

(22) Filed: Mar. 15, 2001

(65) Prior Publication Data

US 2001/0023212 A1 Sep. 20, 2001

(30) Foreign Application Priority Data

Mar. 15, 2000 (JP) ......................................... 2000-072583

(51) Int. Cl.$^7$ .............................................. F16G 13/04
(52) U.S. Cl. ........................................ 474/213; 474/214
(58) Field of Search ............................... 474/212, 213, 474/214, 215

(56) References Cited

U.S. PATENT DOCUMENTS

| | | | | |
|---|---|---|---|---|
| 1,800,557 A | * | 4/1931 | Merkle | 474/214 |
| 1,947,734 A | * | 2/1934 | Perry | 474/214 |
| 3,636,788 A | * | 1/1972 | Jeffrey | 474/213 |
| 4,342,560 A | * | 8/1982 | Ledvina | 474/157 |
| 4,915,675 A | * | 4/1990 | Avramidis | 474/213 |
| 4,915,676 A | * | 4/1990 | Komeya | 474/213 |
| 5,114,384 A | * | 5/1992 | Tsuyama | 474/212 |
| 5,628,702 A | * | 5/1997 | Kotera | 474/213 |

FOREIGN PATENT DOCUMENTS

| | | |
|---|---|---|
| EP | 0 384 075 A2 | 8/1990 |
| EP | 0 385 681 A2 | 9/1990 |
| JP | 2-19339 | 5/1990 |
| JP | 8-74940 | 3/1996 |

OTHER PUBLICATIONS

Patent Abstracts of Japan, Power Transmitting Chain, Publication No. 08074940 A, Mar. 19, 1996.
Patent Abstracts of Japan, Link for Silent Chain, Publication No. 61211556 A, Sep. 19, 1996.

* cited by examiner

Primary Examiner—Christopher P. Schwartz
Assistant Examiner—Devon Kramer
(74) Attorney, Agent, or Firm—Howson and Howson (57) ABSTRACT

Each link plate of a low noise silent chain has an inside meshing surface formed on the inside flank of each link tooth. The inside meshing surface includes a convexly arcuate mesh start portion disposed on a tip side of each link tooth, and a convexly arcuate mesh guide portion disposed on a root side of each link tooth. The arcuate mesh guide portion has a radius of curvature and a circular arc length which are greater than a radius of curvature and a circular arc length, respectively, of the convexly arcuate mesh start portion. When the silent chain engages a sprocket, the engagement proceeds smoothly and continuously from the inside meshing surface to the outside meshing surface. This contributes to the reduction of the noise level of the silent chain as a whole through suppression of meshing sound of the outside meshing surface and vibratory chain noise.

11 Claims, 6 Drawing Sheets

LOW NOISE SILENT CHAIN

BACKGROUND OF THE INVENTION

The present invention relates to a silent chain suitable for use in a timing chain power transmission system for automobiles, a chain power transmission system for industrial machinery, and so on.

Conventionally, a silent chain used extensively for power transmission between a crankshaft and a camshaft of an automobile engine is comprised of a large number of interleaved link plates each having a pair of link teeth formed into a bifurcated configuration for mesh with teeth of a sprocket. When the silent chain is in a stretched substantially straight state, an inside meshing surface (inside flank) of each link tooth of one link plate projects slightly outward from an outside meshing surface (outside flank) of laterally overlapping one tooth of the adjacent link plate. With this arrangement, the inside meshing surfaces (inside flanks) of the link plates contact the teeth of the sprocket at the beginning of engagement with the sprocket, and the outside meshing surfaces (outside flanks) of the link plates contact the teeth of the sprocket when the silent chain wraps around the sprocket. In this manner, the contact between the link plates and the sprocket occurs in two steps to reduce the noise during power transmitting operation.

In a conventional silent chain disclosed in Japanese Patent Publication No. (HEI) 2-19339, each link tooth has an arcuate inside meshing surface so profiled as to secure sliding contact with teeth of a sprocket to avoid generation of striking sound when the silent chain starts to mesh with, or leaves from, the sprocket.

In another conventional silent chain disclosed in Japanese Patent Laid-open Publication No. (HEI) 8-74940, each link tooth has an arcuate inside meshing surface whose radius of curvature is set to approximately twice or larger than the chain pitch. During meshing engagement between the silent chain and a sprocket, the arcuate inside meshing surfaces of link plates interfere with teeth of the sprocket so as to suppress up and down motion of the silent chain with respect to the sprocket, thereby reducing the operation noise.

The conventional silent chains are able to reduce meshing sound resulting from engagement of the inside meshing surfaces of the link plates with the sprocket teeth at the start of meshing engagement between the silent chain and the sprocket. However, since the engagement proceeds interruptedly from the inside meshing surfaces to the outside meshing surfaces, additional meshing sound is produced when the outside meshing surfaces contact the sprocket teeth so as to bring the link plates in a completely seated position on the sprocket teeth.

Additionally, the arcuately profiled inside meshing surfaces of the conventional silent chains produce an elastic elongation resulting from up and down movement of the silent chain caused when the silent chain performs a power transmitting operation under stretched condition. Due to the elastic elongation, the chain is slackened at its slack side, thereby causing chordal up and down motion of the chain at the slack side thereof. The chordal up and down motion produces additional vibratory sound, which increases the total noise measured as an overall value during power transmitting operation, and makes it difficult to maintain a constant meshing point with respect to the driven sprocket located at the trailing end of a slack run of the silent chain.

SUMMARY OF THE INVENTION

It is accordingly an object of the present invention to provide a low noise silent chain which can secure smooth and continuous shifting of meshing engagement of the silent chain with a sprocket from the inside meshing surfaces of link teeth to the outside meshing surfaces of the link teeth, thereby reducing the total noise level of the chain through suppression of meshing sound between the outside meshing surfaces and teeth of the sprocket.

Another object of the present invention is to provide a low noise silent chain which is capable of suppressing vibratory sound of the chain during power transmitting operation to thereby reduce the noise level of the chain as a whole.

According to the present invention, there is provided a low noise silent chain for mesh with a sprocket, comprising: a number of link plates each having a pair of link teeth formed into a bifurcated configuration for mesh with teeth of the sprocket. The link plates are interleaved and connected together by connector pins. Each link tooth has an inside meshing surface formed on the inside flank thereof, an outside meshing surface formed on the outside flank thereof, and a tip at which the inside and outside meshing surfaces merge together. The inside meshing surface of one link tooth, when the silent chain is stretched straight, projects slightly outward from the outside meshing surface of another link tooth that overlaps the one link tooth so that the meshing engagement of the link teeth with respect to the sprocket teeth starts from the inside meshing surface and is ended when the outside meshing surface is seated on one sprocket tooth. The inside meshing surface includes a convexly arcuate mesh start portion disposed on a tip side of each link tooth, and a convexly arcuate mesh guide portion disposed on a root side of each link tooth. The convexly arcuate mesh guide portion has a radius of curvature and a circular arc length which are greater than a radius of curvature and a circular arc length, respectively, of the convexly arcuate mesh start portion.

In one preferred form of the invention, the radius of curvature and circular arc length of the convexly arcuate mesh start portion are made irregular between link plates arranged in the longitudinal direction of the silent chain.

It is desirable that the inside meshing surface is profiled such that the inside meshing surface can maintain smooth slide contact with the tooth flank of one sprocket tooth throughout a region extending from the convexly arcuate mesh start portion to the convexly arcuate mesh guide portion. The convexly arcuate mesh start portion and the convexly arcuate mesh guide portion may be directly connected together to form the inside meshing surface. As an alternative, the inside meshing surface may further include an intermediate portion disposed between the convexly arcuate mesh start portion and the convexly arcuate mesh guide portion. The intermediate portion may have a convexly arcuate profile having a radius of curvature different from those of said convexly arcuate mesh start portion and said convexly arcuate mesh guide portion. Alternatively, the intermediate portion may have a rectilinear profile.

In the low noise silent chain, since the meshing proceeds smoothly and continuously from the arcuate mesh guide portion of the inside meshing surface of one link plate to the outside meshing surface of the preceding link plate, a clearance formed between the arcuate mesh guide portion of the link plate and the tooth flank of the sprocket tooth when the link plate seated on the sprocket tooth flank can be minimized. In the case of a sprocket having a maximum number of teeth, the clearance can be reduced to approximately zero.

Teeth of the sprocket used with the low noise silent chain have an involute tooth form. The silent chain can be used in combination with sprockets having any other tooth form than the involute tooth form.

When the silent chain of the present invention engages the sprocket, the inside meshing surface of a leading link tooth of one link plate contacts the tooth flank of one sprocket tooth. In this instance, since the inside meshing surface is formed at least by a convexly arcuate mesh start portion disposed on a tooth tip side and a convexly arcuate mesh guide portion disposed on a tooth root side, the sprocket tooth flank first contacts the arcuate mesh start portion, then slides on the mesh start portion, and subsequently moves into sliding contact with the arcuate mesh guide portion in an uninterrupted manner.

Because the circular arc length of the arcuate mesh guide portion is greater than that of the arcuate mesh start portion, the mesh guide portion can retain a longer engagement time than the mesh start portion. Additionally, since the radius of curvature of the arcuate mesh guide portion is greater than that of the arcuate mesh start portion, the arcuate mesh guide portion can engage the sprocket tooth flank at a smaller sliding angle than the arcuate mesh start portion. With this arrangement, one link plate gradually turns about the connector pin and is thus wrapped around the sprocket while its arcuate mesh guide portion is in slide contact with the tooth flank of one sprocket tooth. During that time, the inside meshing surface of the next following link comes into contact with the tooth flank of the next following sprocket tooth. Thus, the arcuate mesh guide portion has a concurrent slide contact guiding function, in which the respective inside meshing surfaces of two adjacent, longitudinally overlapping link plates contact the respective tooth flanks of two adjacent sprocket teeth in the same instant.

Additionally, since the circular arc length of the arcuate mesh guide portion is greater than that of the arcuate mesh start portion, the mesh guide portion can achieve smooth sliding contact with, and gradual separation from, the sprocket tooth flank. During that time, the preceding link plate gradually turns about the connector pin in such a manner as ro wrap around the sprocket. In this instance, the outside meshing surface of the trailing link tooth of the preceding link plate comes into contact with the same sprocket tooth flank, then is seated on the sprocket tooth flank. Thus, the arcuate mesh guide portion of the inside meshing surface of one link plate and the outside meshing surface of the preceding link plate concurrently make contact with the tooth flank of the same sprocket tooth at least in a moment, and thereafter, the arcuate mesh guide portion separates from the same sprocket tooth flank. The arcuate mesh guide portion also has an uninterrupted meshing guide function, in which the engagement of the arcuate mesh guide portion of one link plate with respect to one sprocket tooth is uninterruptedly taken over by the engagement of the outside meshing surface of the preceding link plate with respect to the same sprocket tooth.

By virtue of the concurrent sliding contact guiding function and uninterrupted meshing guide function of the arcuate mesh guide portion, the individual link plates of the silent chain are successively seated on the sprocket teeth to perform a power transmitting operation.

Because the arcuate mesh start portion located on a tooth tip side of the inside meshing surface of one link plate is profiled to project slightly outward from the outside meshing surface of the adjacent link plate, the working line (meshing line) of the silent chain is lifted up when the arcuate mesh start portion contacts the sprocket tooth at the start of meshing engagement between the silent chain and the sprocket. By thus lifting the meshing line, the silent chain is tensioned, so that a chain slack produced on the slack side of the silent chain can be taken up. Thus, chordal up and down motion of the chain and vibrations of the chain can be suppressed.

In the case where the radius of curvature and circular arc length of the convexly arcuate mesh start portion are made irregular between the link plates arranged in the longitudinal direction of the silent chain, the timing of meshing engagement between the arcuate mesh start portions of the individual link plates and the sprocket teeth is variable between the link plates arranged in the longitudinal direction of the silent chain. This arrangement contributes to suppression of periodic changes or fluctuations of the meshing engagement.

BRIEF DESCRIPTION OF THE DRAWINGS

A preferred embodiment of the present invention will now be described in detail, by way of examples only, with reference to the accompanying drawings, in which.

DETAILED DESCRIPTION OF THE PREFERRED EMBODIMENT

The following description is merely exemplary in nature and is in no way intended to limit the invention or its application or uses.

Figure 1:
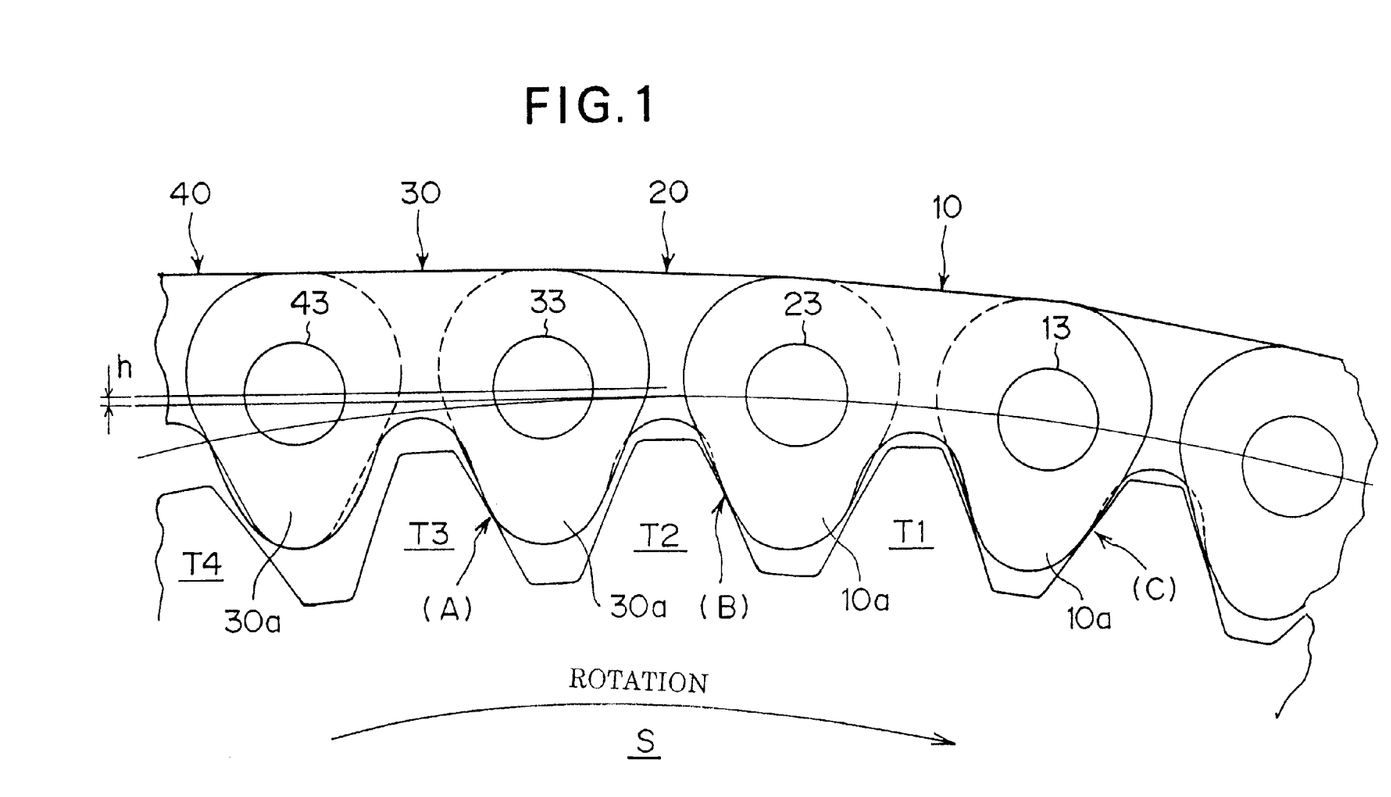
FIG. 1 is a fragmentary front elevational view illustrative of the manner in which a low noise silent chain according to an embodiment of the present invention meshes with a sprocket.

Referring now to the drawings and FIG. 1 in particular, there is shown a low noise silent chain according to one embodiment of the present invention. The silent chain is comprised of a large number of link plates (four being designated by 10, 20, 30 and 40) each having a pair of link teeth 10*a*, 20*a*, 30*a*, 40*a* formed into a bifurcated configuration. The link plates 10, 20, 30, 40 are interleaved and connected by connector pins 13, 23, 33, 43 in an endless fashion.

Though not shown, the silent chain also has guide plates arranged in pairs on the opposite outer sides of the silent chain for guided engagement with opposite end faces of a sprocket S to prevent the silent chain from being displaced off the sprocket S.

In the illustrated embodiment, the connector pins 13, 23, 33, 43 are comprised of round pins. This invention can be applied to the so-called rocker joint-type silent chain, in which rocker joint pins are used in place of the round pins. The sprocket S used in combination with the silent chain has a series of evenly spaced sprocket teeth having an involute tooth form.

Figure 2:
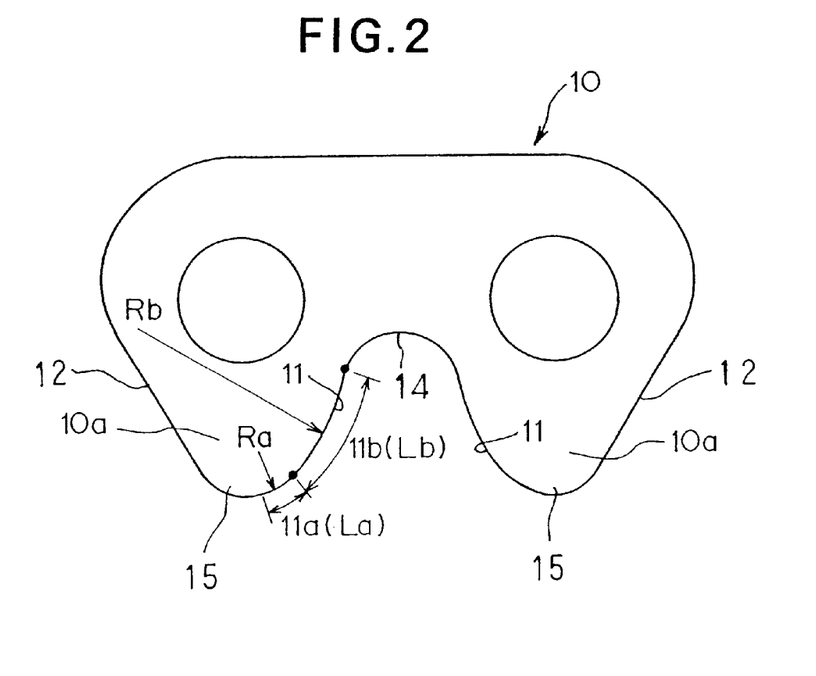
FIG. 2 is a front elevational view of a link plate of the silent chain.

FIG. 2 shows the outside shape or profile of each link plate (the link plate 10 being shown). Each link tooth 10a of the link plate 10 has an inside meshing surface 11 formed on the inside flank of the link tooth 10a and an outside meshing surface 12 formed on the outside flank of the link tooth 10a. The inside meshing surfaces 11 of the respective link teeth 10a are joined by a concavely arcuate crotch 14. The inside meshing surface 11 on the inside tooth flank and the outside meshing surface 12 on the outside tooth flank marge with each other at a tip 15 of the link tooth 10a. The inside meshing surfaces 11 each include a convexly arcuate mesh start portion 11a disposed on a tip side of the link tooth 10a, and a convexly arcuate mesh guide portion 11b disposed on a root side (crotch side) of the link tooth 10a. The convexly arcuate mesh guide portion 11b has a radius of curvature Rb and a circular arc length Lb that are greater than a radius of curvature Ra and a circular arc length La, respectively, of the convexly arcuate mesh start portion 11a. The outside meshing surface 12 has a rectilinear profile.

With the link teeth 10a thus profiled, when the silent chain is in a stretched straight state, the inside meshing surface 11 of each link tooth 10a of one link plate 10 projects slightly outward from the outside meshing surface of a laterally overlapping tooth 20a of the adjacent link plate 20 (see the positional relationship between the convexly arcuate inside meshing surface 31 of the link plate 30 and the rectilinear outside meshing surface 42 of the link plate 40 shown in FIG. 1).

Figure 3:
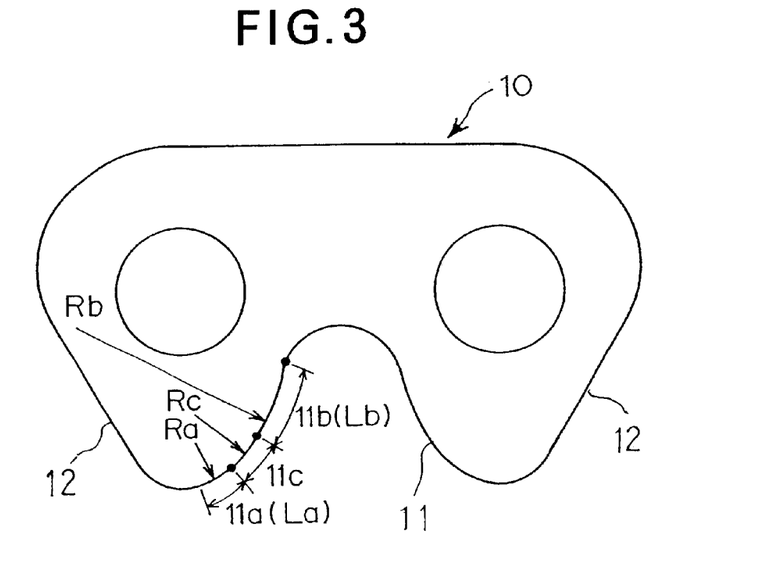
FIG. 3 is a view similar to FIG. 2, but showing a link plate according to a modification of the present invention.
Figure 4:
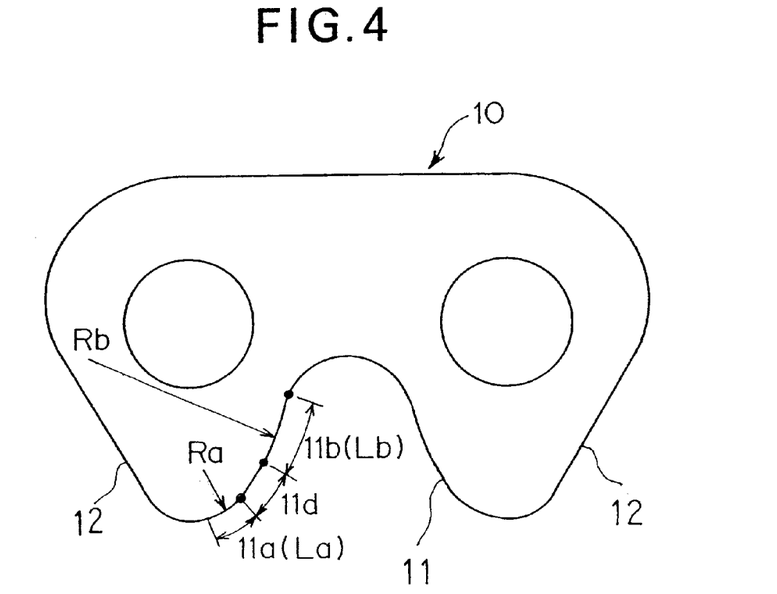
FIG. 4 is a view similar to FIG. 2, but showing a link plate according to another modification of the present invention.

In the case of the inside meshing surface 11 shown in FIG. 2, the convexly arcuate mesh start portion 11a and the convexly arcuate mesh guide portion 11b are contiguous with each other. This arrangement is not essential to the present invention. The convexly arcuate mesh start portion 11a and the convexly arcuate mesh guide portion 11b may be connected either by a convexly arcuate intermediate portion 11c such as shown in FIG. 3, or alternatively by a rectilinear intermediate portion 11d such as shown in FIG. 4. Importantly, the inside meshing surface 11 is profiled such that as the silent chain comes in mesh with the sprocket S, the inside meshing surface 11 can maintain smooth slide contact with the tooth flank of one sprocket tooth over a region extending from the mesh start portion 11a to the mesh guide portion 11b.

It is preferable that the radius of curvature Ra and circular arc length La of the convexly arcuate mesh start portion are made irregular between the link plates 10, 20, 30, 40 arranged in series in the direction of the length of the silent chain. with this arrangement, since the timing of meshing engagement between the arcuate mesh start portions of the individual link plates and the sprocket teeth is variable between the link plates arranged in the longitudinal direction of the silent chain, periodic changes or fluctuations of the meshing engagement between the link plates and the sprocket teeth can be suppressed.

Figure 5A:
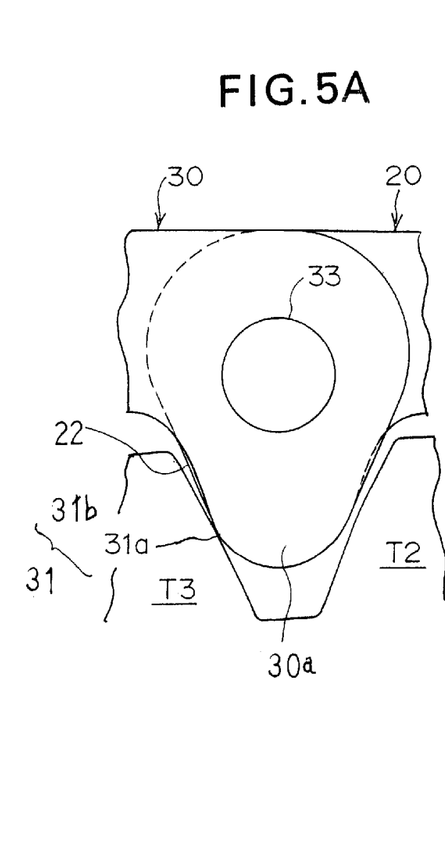
FIG. 5A is an enlarged view of a portion of FIG. 1, showing an arcuate mesh start portion of one link plate being in in slide contact with one sprocket tooth.
Figure 5B:
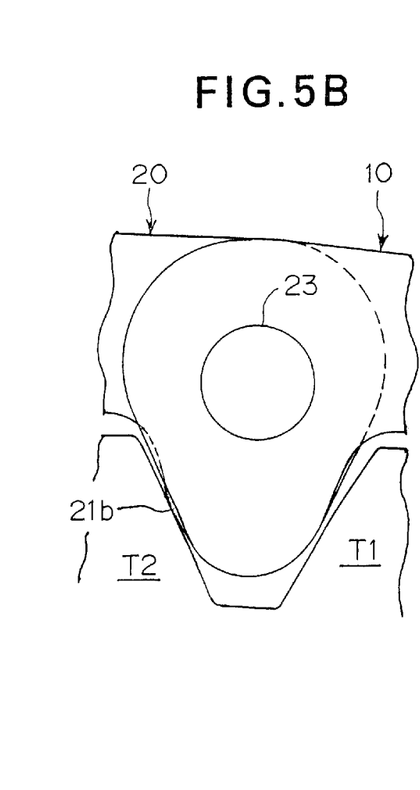
FIG. 5B is a view similar to FIG. 5A, but showing an arcuate mesh guide portion of another link plate being in slide contact with another sprocket tooth.
Figure 5C:
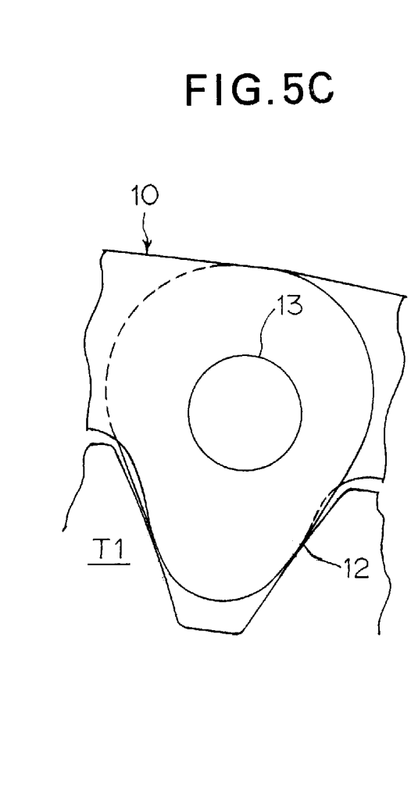
FIG. 5C is a view similar to FIG. 5A, but showing an outside meshing face of another link plate being seated on another sprocket tooth.

Next, with reference to FIG. 1 and FIGS. 5A to 5C, a sequence of meshing operations of the silent chain will be described on the basis of time-dependent changes in position of the link plate 30. FIGS. 5A, 5B and 5C are enlarged views of the portions indicated respectively by characters A, B and C in parentheses shown in FIG. 1. In FIG. 5A, the convexly arcuate mesh start portion 31a of the link plate 30 is in slide contact with the tooth flank of one sprocket tooth T3. In FIG. 5B, the convexly arcuate mesh guide portion 21b of the link plate 20 is in slide contact with the tooth flank of another sprocket tooth T2. In FIG. 5C, the outside meshing surface 12 of the link plate 10 is seated on the tooth flank of another sprocket tooth (not designated).

First as shown in FIG. 5A, one sprocket tooth T3 starts to mesh with the inside meshing surface 31 of one link tooth 30a which is located at the leading side of the link plate 30 as viewed in the direction of rotation of the sprocket S. In this instance, the sprocket tooth T3 contacts the convexly arcuate mesh start portion 31 of the inside meshing surface 31.

Then, the sprocket tooth T3 advances by one tooth pitch while keeping engagement with the convexly arcuate mesh start portion 31a of the inside meshing surface 31 of the link plate 30. During that time, the point of engagement between the sprocket tooth T3 and the inside meshing surface 31 moves or shifts continuously from the convexly arcuate mesh start portion 31a to the convexly arcuate mesh guide portion 31b until the link plate 30 assumes the same position as the preceding link plate 20 shown in FIG, 5B. The arcuate mesh guide portion 21b of the link plate 20 corresponds to the arcuate mesh guide portion 31b of the link plate 30. The link plate 30, as it is wrapped around the sprocket S, turns clockwise about the connector pin 33 with the arcuate mesh guide surface 31b being held in slide contact with the tooth flank of the sprocket tooth T3. In this instance, the convexly arcuate mesh start portion 41a of the leading link tooth 40a (FIG. 1) of the next following link plate 40 (FIG. 4), which is overlapping with the trailing link tooth 30a of the link plate 30, comes into contact with the tooth flank of the following sprocket tooth T4 (FIG. 1) in the same manner as described above with reference to FIG. 5A. Thus, the silent chain is guided around the sprocket S in such a manner that the respective inside meshing surfaces 31, 41 of two adjacent, longitudinally overlapping link plates concurrently make contact with two adjacent sprocket teeth T3 and T4, respectively.

As the sprocket 5 (FIG. 1) further turns in the direction of the arrow by one tooth pitch, the preceding link plate 20 longitudinally overlapping with the link plate 30 is wrapped around the sprocket S while turning clockwise about the connector pin 33. During that time, the arcuate mesh guide portion 31b of the link plate 30 and the outside meshing surface 22 of the preceding link plate 20 concurrently make contact with the tooth flank of the same sprocket tooth T3 at least in a moment and, thereafter, the arcuate mesh guide portion 31 of the link plate 30 gradually separates from the tooth flank of the sprocket tooth T3. Thus, the outside meshing surface 22 of the preceding link plate 20 uninterruptedly takes over the engagement with the sprocket tooth T3 from the arcuate mesh guide portion 31b of the link plate 30.

As explained above, the link plates 10, 20, 30, 40 are seated in succession on the sprocket teeth T1,T2, T3, T4 to thereby achieve a power transmitting operation.

Figure 6A:
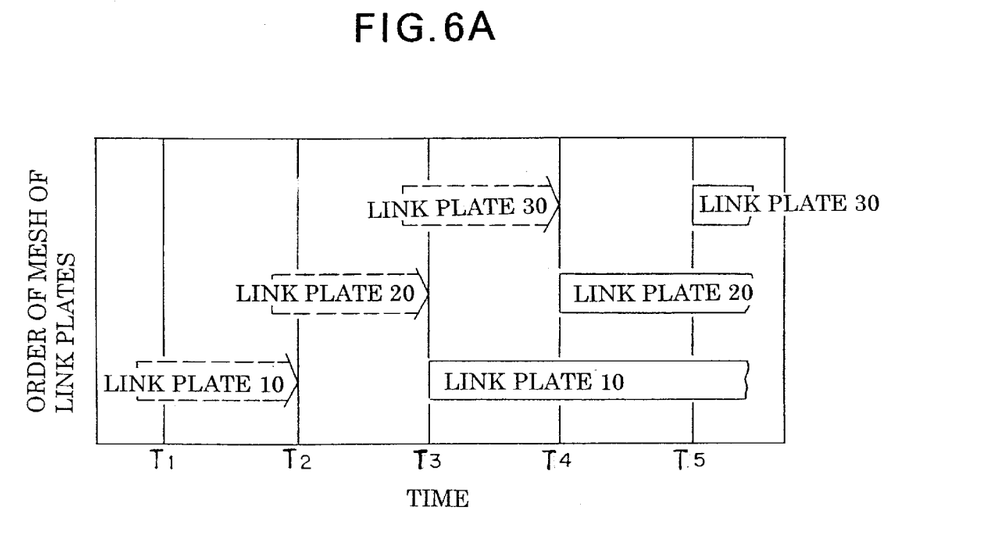
FIG. 6A is a timing chart showing the progress of meshing engagement between the silent chain of the present invention and the sprocket.
Figure 6B:
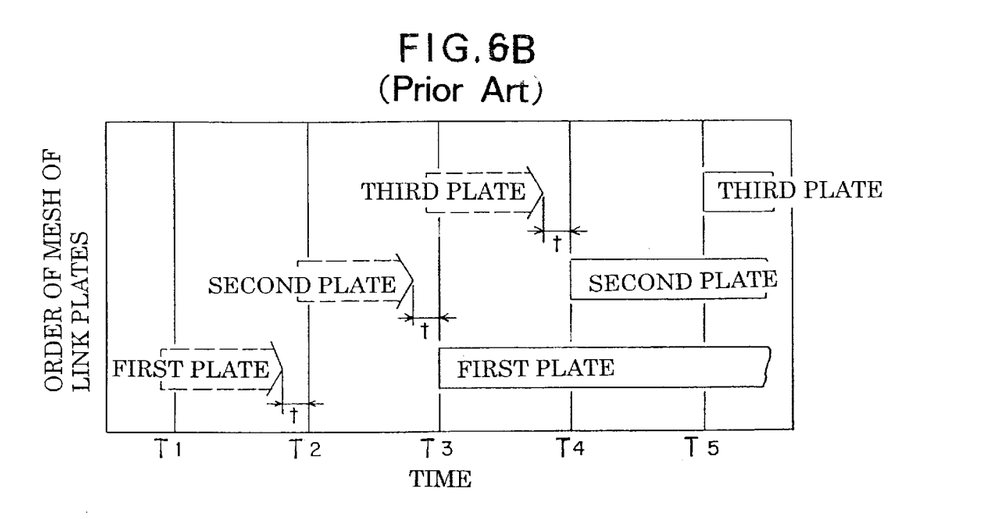
FIG. 6B is a timing chart showing the progress of meshing engagement between a conventional silent chain and the sprocket.

FIG. 6A is a timing chart illustrative of the manner in which three consecutive link plates 10, 20 and 30, overlapping in the direction of the length of the silent chain of the present invention, mesh with the teeth T1–T5 of the sprocket S while shifting the point of contact from the inside meshing surface to the outside meshing surface. In FIG. 6A, rectangular blocks indicated by broken lines each show a range of engagement of the inside meshing surface of one link plate 10, 20, 30 with respect to the sprocket teeth, and rectangular blocks indicated by solid lines each show a range of engagement of the outside meshing surface of one link plate 10, 20, 30 with respect to the sprocket teeth. FIG. 6B is a time chart illustrative of the manner in which three consecutive, longitudinally overlapping link plates of a conventional silent chain mesh with three consecutive teeth T1–T5 of the sprocket S. In the conventional silent chain, the contact between the link plates and the sprocket teeth is in two steps, i.e., the inside meshing surface contacts first, then the outside meshing surface contacts. In FIG. 6B, broken-lined rectangular blocks each indicate a range of engagement of the inside meshing surface of one link plate with respect to the sprocket teeth, solid-lined rectangular blocks each indicate a range of engagement of the outside meshing surface of one link plate with respect to the sprocket teeth, and reference character 't' denotes the duration of a non-contacting state occurring between the end of an inside meshing surface contact state and the start of an outside meshing surface contact state.

It appears clear from FIGS. 6A and 6B that the engagement of the convexly arcuate mesh guide portion 31b (FIG. 5A) of the inside meshing surface 31 of the link plate 30 with respect to the sprocket tooth T4 is continuously taken over by the outside meshing surface 22 (FIG. 5A) of the link plate 20 without producing interruption which may occur in the conventional silent chain as indicated by the non-contact time 't' shown in FIG. 6B. Accordingly, the outside meshing surfaces of the link plates do not produce meshing noise.

Figure 7:
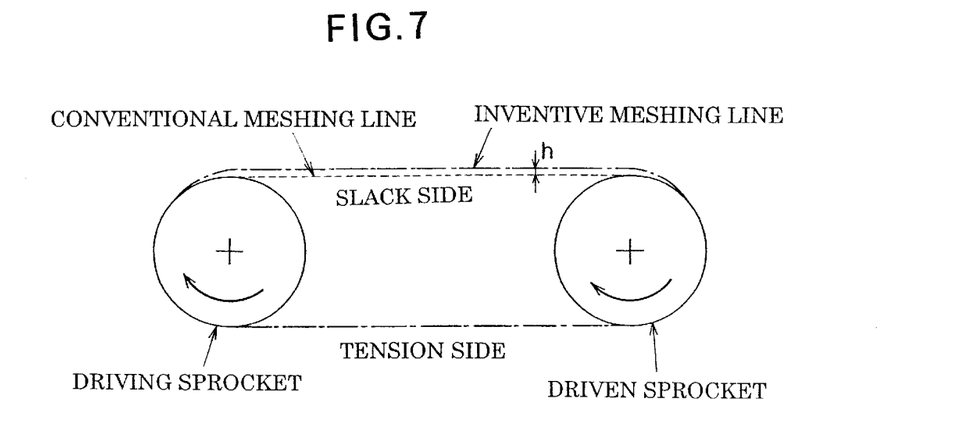
FIG. 7 is a diagrammatical view showing the low noise silent chain of the present invention as it is stretched between a driving sprocket and a driven sprocket.
Figure 8:
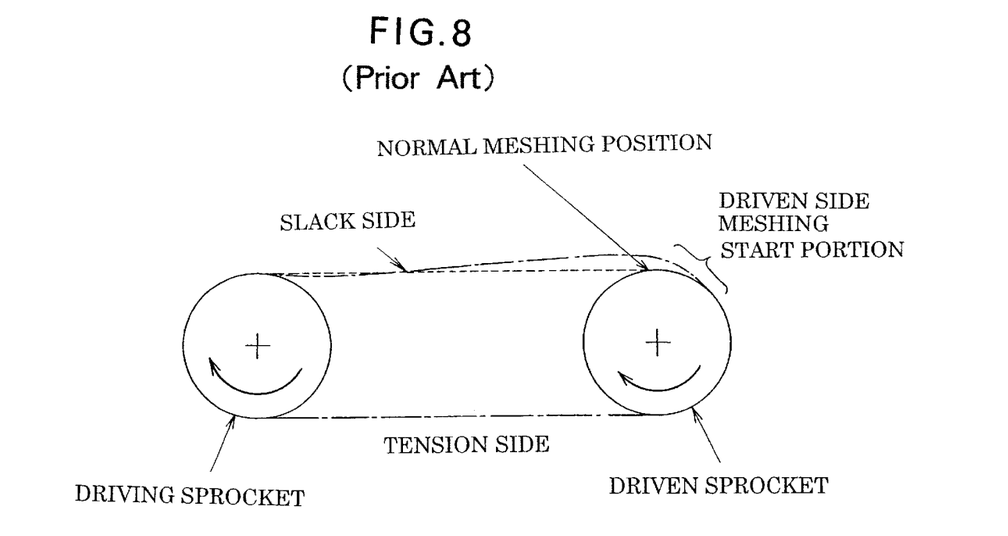
FIG. 8 is a diagrammatical view showing a conventional silent chain as it is stretched between the driving and a driven sprockets.

Additionally, when the silent chain starts to mesh with the driven sprocket S, the convexly arcuate mesh start portion of the leading link tooth of one link plate (link plate 30, for example), which projects slightly outward from the outside meshing surface of the trailing link tooth 20 of the preceding link plate (link plate 20, for example), contacts the sprocket tooth T3, so that the working line (also called the "meshing line") of the silent chain is lifted up by a distance 'h' as shown in FIGS. 1 and 7. With this upward shift of the meshing line, the chain tension is increased, so that the free run of the silent chain, also called the "slack run," disposed on the slack side of the silent chain, is stretched, and thereby takes up slack or looseness of the silent chain. By thus stretching the slack side of the silent chain, chordal up and down motion of the chain's slack run can be suppressed. In contrast, in the conventional silent chain shown in FIG. 8, chordal up and down motion of the chain's slack run occurs due to slack or looseness of the chain's slack run.

As described above, when the silent chain of the present invention engages the sprocket S, the engagement proceeds smoothly and uninterruptedly from the inside meshing surface 31 of one link tooth 30a to the outside meshing surface 22 of the overlapping link tooth 20a. With this engagement, meshing sound of the outside meshing surfaces and vibratory sound of the chain as a whole can be suppressed. This contributes to the reduction Obviously, various minor changes and modifications of the present invention are possible in the light of the above teaching. It is therefore to be understood that within the scope of the appended claims, the present invention may be practiced otherwise than as specifically described.

What is claimed is:

1. A low noise silent chain for mesh with a sprocket, comprising:

a number of link plates each having a pair of link teeth formed into a bifurcated configuration for mesh with teeth of the sprocket, the link plates being interleaved and connected together by connector pins, each link tooth having an inside flank and an outside flank, an inside meshing surface formed on the inside flank thereof, an outside meshing surface formed on the outside flank thereof, and a tip at which the inside and outside meshing surfaces merge together, the inside meshing surface of one link tooth, when the silent chain is stretched straight, projecting slightly outward from the outside meshing surface of another link tooth that overlaps the one link tooth so that meshing engagement of the link teeth with respect to the sprocket teeth starts from the inside meshing surface and is ended when the outside meshing surface is seated on one sprocket tooth;

said inside meshing surface including a convexly arcuate mesh start portion disposed on a tip side of each link tooth, and a convexly arcuate mesh guide portion disposed on a root side of each link tooth; and said convexly arcuate mesh guide portion having a radius of curvature and a circular arc length which are greater than the radius of curvature and the circular arc length, respectively of said convexly arcuate mesh start portion.

2. A low noise silent chain according to claim 1, wherein said convexly arcuate mesh start portion and said convexly arcuate mesh guide portion are directly connected together to form the inside meshing surface.

3. A low noise silent chain according to claim 1, wherein said inside meshing surface further includes an intermediate portion disposed between said convexly arcuate mesh start portion and said convexly arcuate mesh guide portion.

4. A low noise silent chain according to claim 3, wherein said intermediate portion has a convexly arcuate profile having a radius of curvature different from those of said convexly arcuate mesh start portion and said convexly arcuate mesh guide portion.

5. A low noise silent chain according to claim 3, wherein said intermediate portion has a rectilinear profile.

6. A low noise silent chain according to claim 1, wherein said radius of curvature and circular arc length of said convexly arcuate mesh start portion are made irregular between link plates arranged in the longitudinal direction of the silent chain.

7. A low noise silent chain according to claim 2, wherein said radius of curvature and circular arc length of said convexly arcuate mesh start portion are made irregular between link plates arranged in the longitudinal direction of the silent chain.

8. A low noise silent chain according to claim 3, wherein said radius of curvature and circular arc length of said convexly arcuate mesh start portion are made irregular between link plates arranged in the longitudinal direction of the silent chain.

9. A low noise silent chain according to claim 4, wherein said radius of curvature and circular arc length of said convexly arcuate mesh start portion are made irregular between link plates arranged in the longitudinal direction of the silent chain.

10. A low noise silent chain according to claim 5, wherein said radius of curvature and circular arc length of said convexly arcuate mesh start portion are made irregular between link plates arranged in the longitudinal direction of the silent chain.

11. A low noise silent chain according to claim 1, in which said connector pins are from the group consisting or round pins and rocker pins.

* * * * *